J. D. TIPPLE.
SPRING TIRE.
APPLICATION FILED MAR. 29, 1915.
1,222,905.
Patented Apr. 17, 1917.
2 SHEETS—SHEET 1.
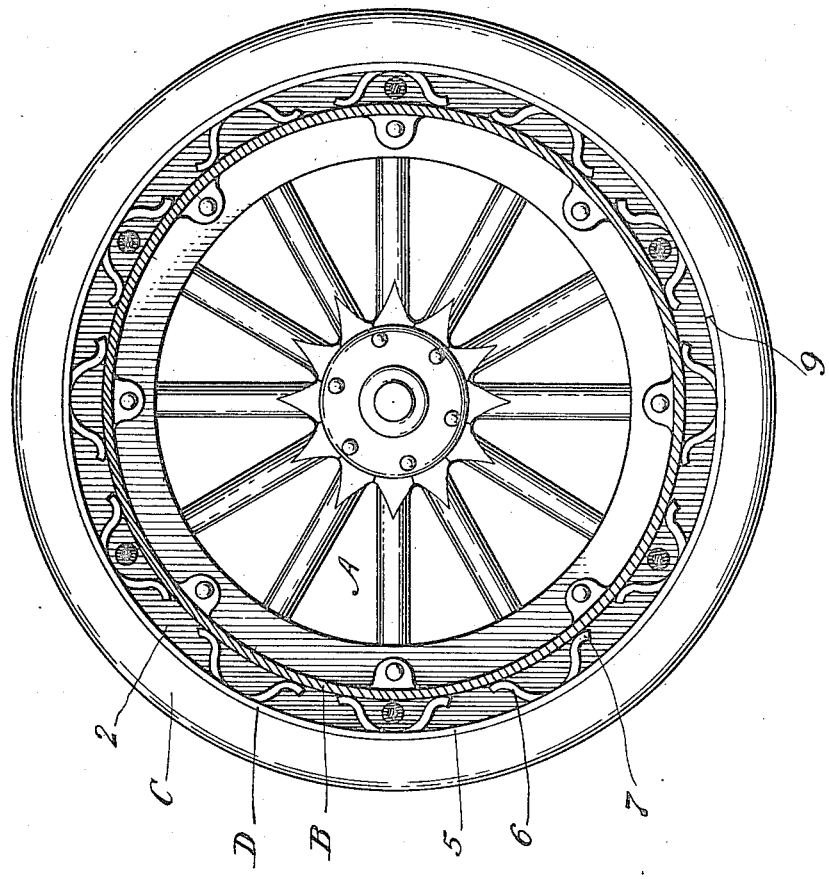
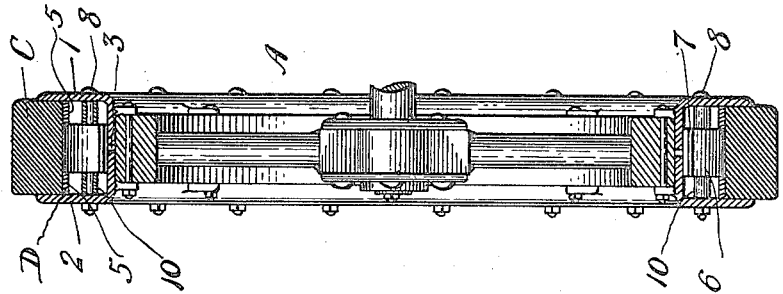
Witnesses
Jos. V. Michael, Jr.
M. E. Clark.
Inventor
James D. Tipple
By Edson Bros
Attorneys
THE NORRIS PETERS CO., PHOTO-LITHO., WASHINGTON, D. C.

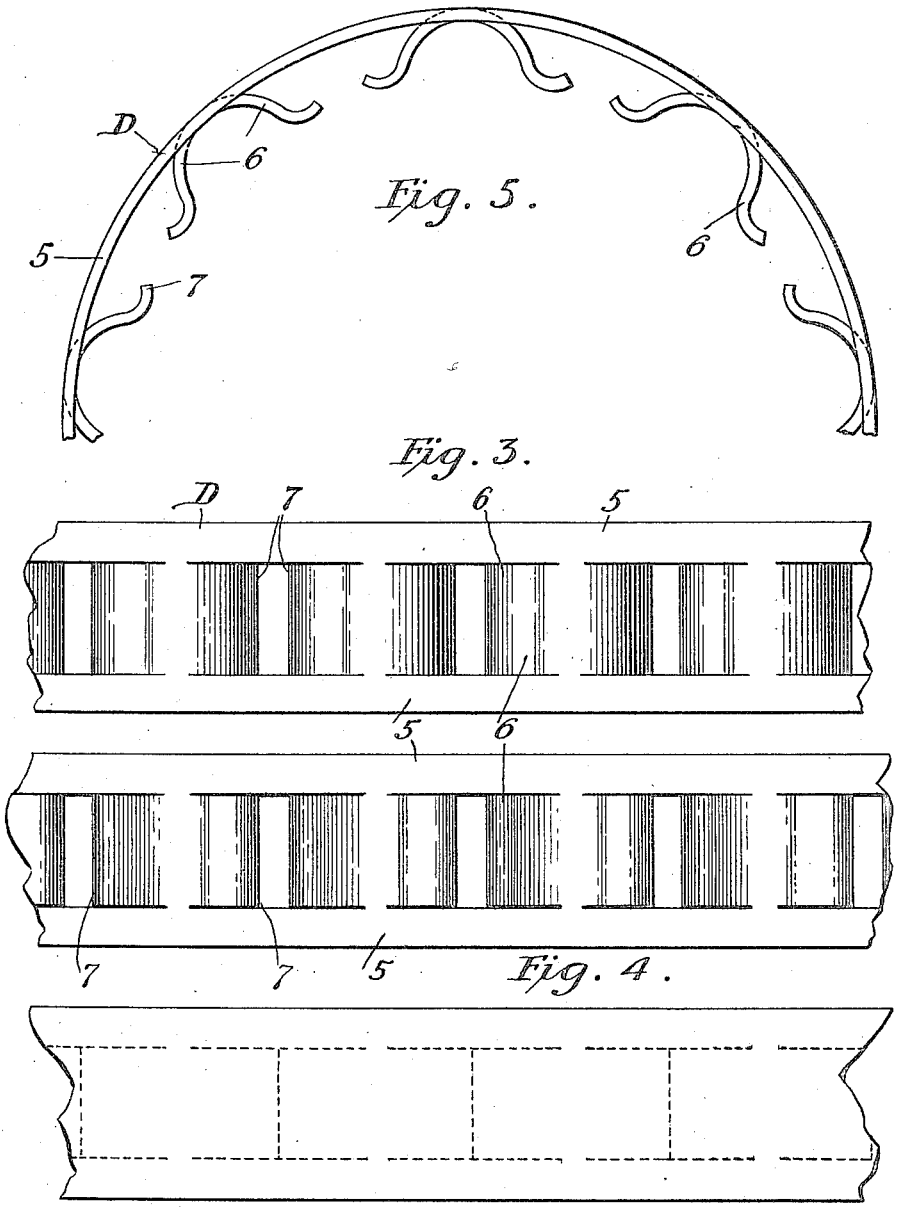

UNITED STATES PATENT OFFICE.

JAMES D. TIPPLE, OF WEST NASHVILLE, TENNESSEE.

SPRING-TIRE.

1,222,905. Specification of Letters Patent. Patented Apr. 17, 1917.

Application filed March 29, 1915. Serial No. 17,664.

*To all whom it may concern:*

Be it known that I, JAMES D. TIPPLE, a citizen of the United States, residing at West Nashville, in the county of Davidson and State of Tennessee, have invented certain new and useful Improvements in Spring-Tires; and I do hereby declare the following to be a full, clear, and exact description of the invention, such as will enable others skilled in the art to which it appertains to make and use the sme.

This invention relates to spring tires for vehicle wheels and more particularly to wheels of the demountable rim type, the object of the invention being to provide a wheel of this character with resilient tire whereby the usual pneumatic tire may be dispensed with.

With this and other objects in view, which will become apparent from the following description taken in connection with the accompanying drawings, the present invention comprises a spring tire for wheels wherein a wheel is provided with a tread element and a demountable rim, a resilient member interposed between said tread element and said rim, and depending means integral with said resilient member adapted to maintain the tread element in its distended position with respect to the rim.

This invention further consists in the features of construction, and the combination of parts hereinafter described and claimed.

In the drawings one embodiment of the invention is disclosed for purposes of illustration, and in which drawings:

Figure 1 is a side elevation of a wheel embodying my spring tire, with one of the side plates broken away.

Fig. 2 is a vertical sectional view through the wheel.

Fig. 3 is a top plan view of a portion of the resilient member.

Fig. 4 is a bottom plan view thereof.

Fig. 5 is a side elevation thereof.

Fig. 6 is a plan view of the blank from which the resilient member is made.

In the drawings like characters of reference are used to designate corresponding parts of the several views, wherein A represents a wheel of ordinary construction having a spring tire thereon, said wheel being provided with a demountable rim B, the flanges 1 and 2 of which extend upwardly to engage a tread member C, said tread member being preferably constructed of solid rubber or the like. As is customary in constructing wheels of the character disclosed in the drawings, the demountable rim B is split along its periphery as shown at 3, for the purpose of removing either of the flanges 1 or 2, the two sections of the demountable rim B being detachably secured to the felly of the wheel by any suitable retaining means. Interposed between the demountable rim B and the tread member C is positioned a resilient member D adapted to yieldingly support the tread member with respect to the rim of the wheel. It is preferred to construct the resilient member D from a single piece of metal, such as shown in Fig. 6 of the drawings.

As shown in the drawings, the resilient member formed from a single piece of metal, is provided with two substantially parallel rings 5 adapted to engage the tread member C. Depending from the resilient member D intermediate the substantially parallel rings 5, are a plurality of rim engaging members 6 shown in the drawings as being integral with the rings 5 and in the form of leaf springs, the ends 7 of which are curved slightly upward for engagement with the demountable rim B. It will be noted from the drawing that the rings 5 and the depending spring members 6 are integral. When in position on the wheel, the substantially parallel rings 5 of the spring member D, it will be noted, engage the flanges 1 and 2 of the demountable rim B, thereby retaining the depending rim engaging member 6 in a centrally disposed position.

As shown in Figs. 1 and 2, there are suitable bolts 8 adapted to clamp the upper ends of the flanges 1 and 2 of the rim B firmly against the tread member C, thus preventing accidental displacement of said tread member C. It will also be noted that this construction prevents any foreign matter from entering the chamber wherein the resilient member D is retained. The bolts 8, the principal function of which is to firmly clamp the flanges 1 and 2 of the rim B into engagement with the tread member C, it will also be noted, serve as means whereby the resilient member D is prevented from creeping on the rim B. In order to reduce the friction between the resilient member D and the bolts 8, should the same come into engagement, it is preferred to loosely mount on said bolts 8, sleeves 10. It will be noted that this construction greatly reduces the wear on both the resilient member D and the bolts 8.

In actual practice, if it is desired to replace a pneumatic tire with my improvements, it is merely necessary to remove one of the flanges of the demountable rim B from the felly of the wheel, take off the pneumatic tire, and place thereon the resilient element D together with the tread member C. The previously removed flange of the rim B is then replaced on the wheel, thus clamping the tread member C firmly in position. It will be noted from Fig. 1 of the drawings that it is preferred to provide the resilient member D with a transverse split 9 which will permit of said resilient member D being sprung into position on the wheel. It will also be understood that if desired, the spring member D may be made in halves, quarters or even smaller sections, which would operate in substantially the same manner as the resilient member herein described.

It is to be understood that the device is susceptible to various changes, but the right is reserved to make such alterations and modifications in the construction thereof as may fairly fall within the scope of the appended claims.

Having thus described my invention, what I claim as new and desire to secure by Letters Patent is:

1. A spring tire for wheels including a tread member and a resilient element therefor, said resilient element comprising a plurality of substantially parallel outer rings and a plurality of depending arcuate leaf-spring members interposed between said rings and formed as an integral part of the plate.

2. In a spring tire for wheels, a tread member and a resilient element therefor, said resilient element comprising a plurality of substantially parallel ring-like members and a plurality of interposed depending resilient members, the ends of which are adapted to bear upon a portion of a wheel, the outer portions of the resilient depending members being integrally connected to the ring-like members and the portions of said resilient depending members adjacent to said outer portions being free to move between the ring-like members, said ring-like members and said depending members being formed from a single strip of metal in such manner that the entire strip is utilized in the formation thereof.

In testimony whereof, I affix my signature, in presence of two witnesses.

JAMES D. TIPPLE.

Witnesses:
 B. A. LANDERS,
 M. N. YOUNG.

Copies of this patent may be obtained for five cents each, by addressing the "Commissioner of Patents, Washington, D. C."